March 29, 1949.  E. J. MARSLEK  2,465,546

SHAFT SEAL

Filed Oct. 29, 1945

Emil J. Marslek
Inventor.
Haynes and Koenig
Attorneys.

Patented Mar. 29, 1949

2,465,546

UNITED STATES PATENT OFFICE 2,465,546

SHAFT SEAL

Emil J. Marslek, Chicago, Ill., assignor, by mesne assignments, to Cartridge Type Seal Company, Chicago, Ill., a corporation of Illinois Application October 29, 1945, Serial No. 625,407

3 Claims. (Cl. 288—3)

This invention relates to shaft seals, and with regard to certain more specific features, to rotary shaft seals of the circular sliding-contact type.

The invention is an improvement upon that disclosed in U. S. patent application of Harvey S. Pardee, Serial No. 511,052, filed November 20, 1943, for Shaft seal, eventuated as Patent 2,393,260.

Among the several objects of the invention may be noted the provision of a more reliable prefabricated unit shaft seal for high rotary speeds under low friction; the provision of a seal of the class described which will remain positively leakproof throughout a long life; and the provision of a seal of this class which may be made up at low cost. Others objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

Figure 1:
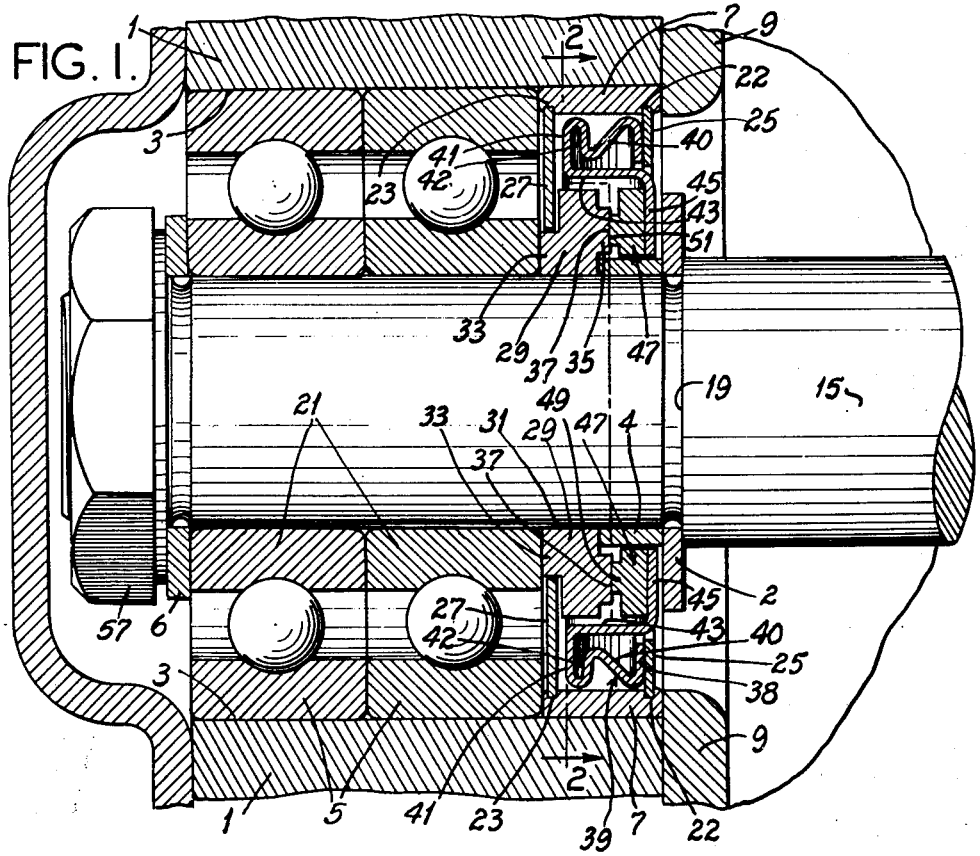
Figure 2:
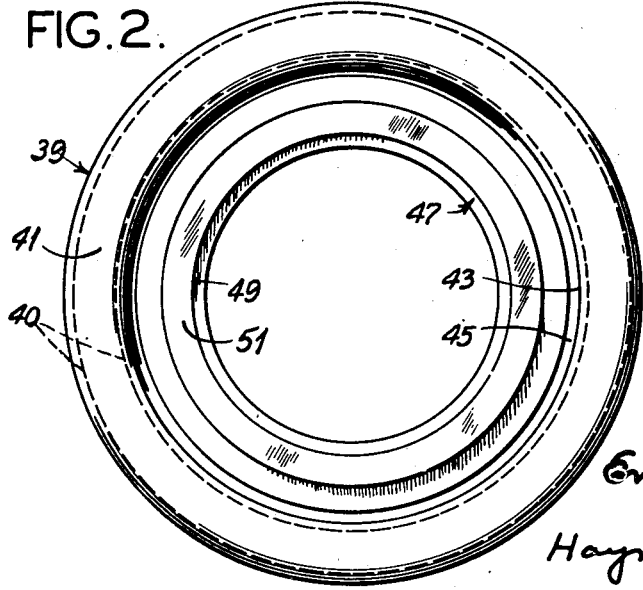

In the accompanying drawings, in which one of various possible embodiments of the invention is illustrated, Fig. 1 is a longitudinal section through a bearing illustrating an application of the invention; and, Fig. 2 is a cross section taken on line 2—2 of Fig. 1.

Similar reference characters indicate corresponding parts throughout the several views of the drawings.

In said patent there is described a structure, several of the parts of which are analogously used in the structure herein described. However, in order to understand the points of departure constituting the present invention, a redescription of some parts will be necessary.

Referring now more particularly to the drawing, there is shown at numeral 1, a part of a machine casing. This is bored as shown at 3 for receiving with close fit the outer races 5 of two ball bearing units.

At numeral 9 is shown an abutment between which and the outer races 5 is located an outer ring 7 forming the outer casing part of my seal. None of the parts 1, 5 and 7 or 9 rotate relatively to one another.

The main rotating element to be sealed is the rotary shaft carrying inner bearing races 21. A shoulder 19 on the shaft supports a ring 2. The end of the shaft is threaded to receive a nut 57 which when drawn up compresses against the shoulder 19 a ring 6, said inner races 21, a ring 29 forming part of the seal, a ring 4 and said ring 2.

Held to the outer ring 7 at spun-in shoulders 22 and 23 are holder ring supports 25 and 27 respectively, the latter being radially deeper than the former. Within the end holder 27 is the rotating hard steel slip ring 29 having a cylindric opening 31 for accommodating the shaft 15. The fit is such to permit axial movement under medium pressure. The ring 29 rotates with the shaft 15 and the inner races 21 of the adjacent ball bearing.

A circular boss 33 of ring 29 normally extends axially out beyond the outer face of the retaining ring 27. Inside of the sealing unit the ring 29 carries an annular pad 35, the surface 37 of which is machined smooth and polished by lapping. As shown, parts of the slip ring 29 lying inside and radially beyond boss 33 also extend radially beyond the central opening in the ring 27.

Within the narrower retaining ring 25 is located an annular, resilient and imperforate, convoluted sleeve 39. This sleeve has an inwardly directed shoulder 38, and a conical part 40. The inner portion of the cone 40 is connected with a more or less flat and outwardly extending connection 42 which, by means of an external convolution is connected with an inwardly extending radial part 41. This inwardly directed part 41 is connected with a cup-shaped member 43, the latter also having an apertured inwardly directed flange 45. Within this flange or bottom 45 is provided a graphite slip ring 47. Ring 47 carries an annular boss or pad 49 providing a flat sealing surface 51 for engagement with the flat surface 37 of ring 29. The axial length of the convoluted parts 38, 40, 41 and 42 (forming sleeve 39) is such that, upon assembly of the cups 43 with the rings 47 and 29 within the retaining rings 25 and 27, there will be a tendency for the ring 47 to push together the surfaces 51 and 37 and also to push ring 29 against the retainer ring 27. This is before application of the assembly to a bearing. Reaction of the imperforate convolute parts is on the retainer ring 25. All of what may be called the first slip ring 47 is within the cup-shaped member 43 and likewise much of what will be called the second slip ring 29.

From the above it will be seen that after the device has been properly assembled with the ball bearings there will be a low running pressure between the surfaces 37 and 51. The amount that the ring 33 will be pushed into the ring holder 27 depends upon how far this ring 33 extended prior to assembly.

The chief point of departure from the invention described in said application is in the form of the connection between the mouth of the cup 43 and the retainer ring 25. On ring 25 rests the inwardly directed flange 38. It will be understood that the surface finish on the inside of the supporting ring 25 and on the outside of the flange 38 is of a character to prevent leakage at this point. The convolutions 40, 41 and 42 form the connecting sleeve, the whole being made in one integral unit with the cup 7.

The constant thickness of the sheet material of the unit consisting of the cup 43, including the flange 45, and parts 38, 40, 41 and 42 is such that the cup part 43 and 45 gives a substantially non-deformable cup structure. However, the parts 40, 41 and 42 provide axial resiliency particularly in the region of the re-entrantly related flanges 41 and 42.

The material of parts 38, 40, 41, 42, 43 and 45 may be springy metal or one of the synthetic rubber materials, such as a silicone type rubber. An exemplary one of the latter is a high polymeric organo-silicon oxide polymer, called Silastic. Such materials withstand the relatively high temperatures sometimes encountered in seals of this class. Such rubber materials have the added advantage that some parts of a given integral piece, such as the parts 38, 45, 43 and 41 herein may be made stiffer than the parts 42 and 40.

In operation, the slip ring 29 will be rotary with the shaft 15, and the slip ring 47 will be stationary. A rubbing seal occurs at the surfaces 37 and 51. No leakage occurs between the slip ring 47 and flange 45, nor between flange 38 and ring 25. Since the cup 43 including the integral flange 45, and integral parts 38, 40, 41 and 42 prevent leakage elsewhere, an excellent seal is provided.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A one-piece bellows diaphragm for a shaft seal comprising a member formed of a constant thickness of fluid-tight sheet material having a cup-shaped central portion with an inwardly directed bottom flange at one end and an outwardly directed flange at the other end, and a peripherally convoluted axial bellows portion connected to and extending from said outwardly directed flange and lying outside of the cup-shaped portion and extending approximately to the plane of its inwardly directed bottom flange, the thickness of said sheet material being such that in its form in the cup-shaped portion it is relatively rigid and in said bellows form it is axially resilient.

2. A one-piece all-metal bellows diaphragm for a shaft seal comprising a member formed of a constant thickness of sheet metal having a cup-shaped central portion with an inwardly directed bottom flange at one end and an outwardly directed flange at the other end, and a peripherally convoluted axial bellows portion connected to and extending from said outwardly directed flange and lying outside of the cup-shaped portion and extending approximately to the plane of its inwardly directed bottom flange, the thickness of said sheet metal being such that in its form in the cup-shaped portion it is relatively rigid and in said bellows form it is axially resilient.

3. A one-piece non-metallic bellows diaphragm for a shaft seal comprising a member formed of a constant thickness of fluid-tight sheet material of synthetic-rubber type having a cup-shaped central portion with an inwardly directed bottom flange at one end and an outwardly directed flange at the other end, and a peripherally convoluted axial bellows portion connected to and extending from said outwardly directed flange and lying outside of the cup-shaped portion and extending approximately to the plane of its inwardly directed bottom flange, the thickness of said synthetic-rubber sheet material being such that in its form in the cup-shaped portion it is relatively rigid and in said bellows form it is axially resilient.

EMIL J. MARSLEK.

REFERENCES CITED

The following references are of record in the file of this patent:

UNITED STATES PATENTS

| Number | Name | Date |
| --- | --- | --- |
| 1,781,201 | Spreen | Nov. 11, 1930 |
| 1,972,077 | Eberhard | Sept. 4, 1934 |
| 2,419,074 | Herbert | Apr. 15, 1947 |

OTHER REFERENCES

General Electric Review, January 1945, pages 60 and 61. (Copy 288—SR).